F. O. HOAGLAND.
SHAFT COUPLING.
APPLICATION FILED MAR. 11, 1919.
1,325,639.
Patented Dec. 23, 1919.
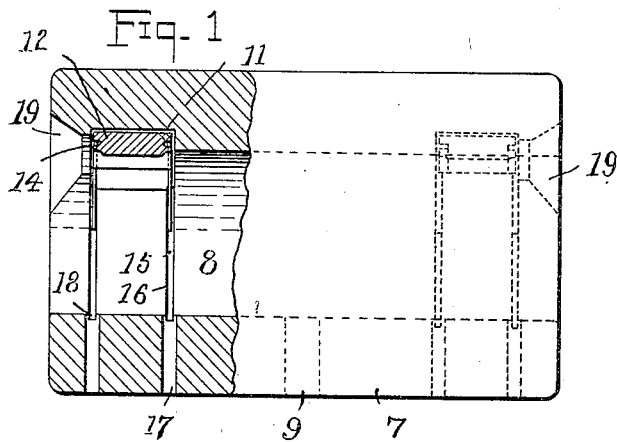
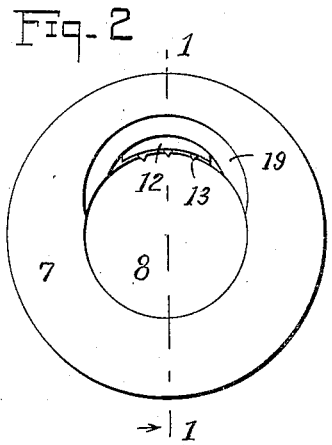
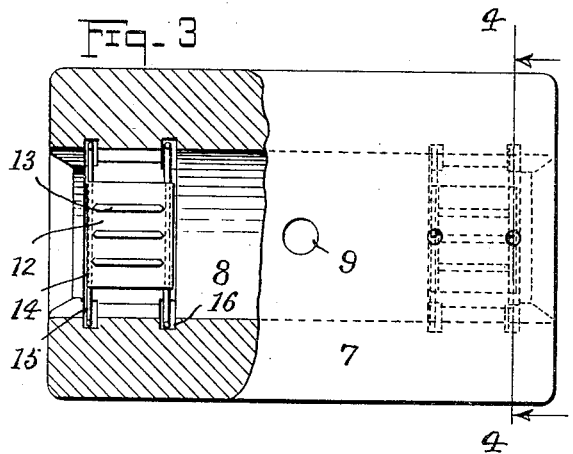
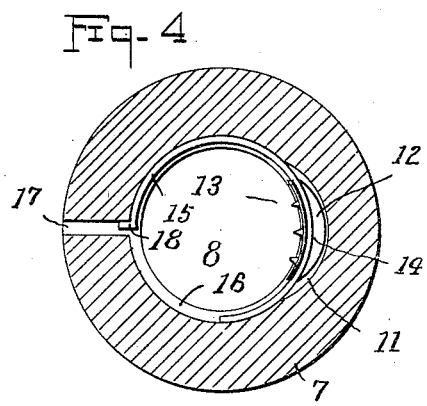
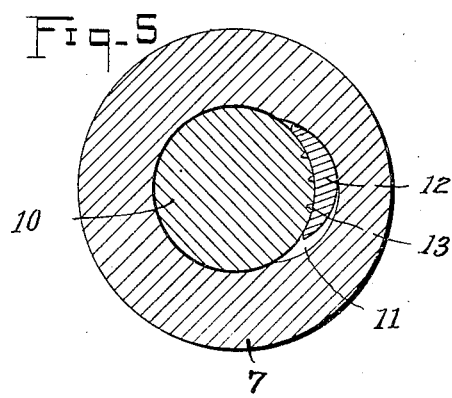
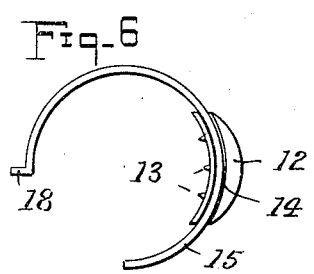
INVENTOR.
Frank O. Hoagland
BY
Chamberlain & Newman
ATTORNEYS.

UNITED STATES PATENT OFFICE.

FRANK O. HOAGLAND, OF BRIDGEPORT, CONNECTICUT, ASSIGNOR TO THE BILTON MACHINE TOOL COMPANY, OF BRIDGEPORT, CONNECTICUT, A CORPORATION OF CONNECTICUT.

SHAFT-COUPLING.

1,325,639.  Specification of Letters Patent.  Patented Dec. 23, 1919.

Application filed March 11, 1919. Serial No. 281,934.

*To all whom it may concern:*

Be it known that FRANK O. HOAGLAND, a citizen of the United States, and resident of Bridgeport, in the county of Fairfield and State of Connecticut, has invented certain new and useful Improvements in Shaft-Couplings, of which the following is a specification.

My invention relates to new and useful improvements in shaft couplings such as are adapted for connecting two alined end portions of a power shaft, to operate as one continuous shaft.

The object of the invention is to improve the construction of shaft couplings of this character and particularly to provide a coupling which will be fully automatic in its application, since it will require no tools for its attachment to the shaft, and will be immediately ready to grip the shaft when positioned thereon whether turned forward or backward; further to design a coupling so that it will not slip, but on the other hand will grip the harder with any increased resistance; to provide suitable wedges for locking the coupling to the shaft, and means whereby the wedges are retained within the coupling whether mounted upon the shafting or not. The invention finally relates to a particular type of shaft coupling embodying a sleeve having chambers therein to receive gripping wedges which are supported so as to automatically engage the shaft and sleeve to lock the same together with the turning of the shaft in either direction.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which:

Figure 1 is a sectional front view of my improved shaft coupling taken on line 1—1 of Fig. 2.

Fig. 2 is an end view of Fig. 1.

Fig. 3 shows a sectional plan view illustrating the clamping wedge positioned in the recess of the bore of the body portion of the coupling.

Fig. 4 is a vertical cross section taken on line 4—4 of Fig. 3.

Fig. 5 is a further cross section, through shaft, coupling and wedge, illustrating the engaged position of the wedge for securing the coupling and shafting together, and Fig. 6 shows a detached side view of wedge and spring as seen in Fig. 4.

The coupling, as will be noted, comprises a relatively long cylindrical cast metal sleeve-like member 7 having a central bore 8 therethrough and a spanner hole 9 positioned midway in the side of the sleeve, and designed to receive a tool for freeing the coupling when positioned upon the shaft. In practice the two abutting end portions of the shaft 10 are positioned in the opposite ends of the bore of the body so that the latter conveys substantially equal portions of each shaft in a way to aline, support and connect the same, and for the purpose of operating them together.

Each end portion of the shafts are separately connected to the respective end portions of the coupling, by automatic locking devices therein which are alike in construction and therefore one description and set of reference characters will be used for the two devices, in the two end portions. The construction of these locking devices as designed and shown are such as to be properly supported within the coupling at all times, both during transit and operation, and is intended to be conveniently slipped on to the end of the shafts in a way to become automatically locked together with the turning of the shaft and without any material loss of time.

In the bore of each end portion of the sleeve is provided a pocket 11 which is substantially of a crescent shape in cross section and having its opposite tapered end portions merging into the inner wall of the bore and having parallel sidewalls whereby the crescent shaped locking wedge 12 positioned therein will be free to move within the radius of the crescent and around the shaft 10 to which the coupling is attached, but in a manner to be held against sidewise movement. These wedges are provided upon their inner face with a series of teeth 13 which in practice engage the periphery of the shaft and become slightly inbedded in its surface to form a locking engagement between the wedge and shaft. The ends of these teeth are rounded as shown, better to allow the assembled coupling to be placed on the ends of the shafts.

I further provide a groove 14 in each end portion of the wedges to receive the guide springs 15 that are positioned in the inner annular grooves 16 of the bore of the body. These springs serve to support the wedges and to guide their tapered end portions into the narrow end portions of the pockets 11 to form a locking engagement between the coupling and shaft. Radial holes 17 are formed in the sleeve in alinement with the annular grooves 16 to receive the outwardly bent end portions 18 of the springs 15 before mentioned. The opposite end of these springs lies free within the annular grooves and are thus susceptible of slight movement as may be brought about by the action of the several parts. The tendency obviously of the springs is to hug the bottom of the grooves 16 in the sleeve and to form a guide for holding the locking wedge in sufficient engagement with the shaft at all times to insure its engagement with the shaft and to be moved forward in between the inclined shoulders of the pocket and the periphery of the shaft when the latter is turned in either direction.

A part of the outer end portions of the body adjacent to its bore is cut away as at 19 to permit the wedge to be seen for the purpose of determining its position as may be necessary, and for the purpose of freeing it should the same become stuck.

Having thus described my invention, what I claim and desire to secure by Letters Patent is—

1. In a shaft coupling, the combination of a sleeve including a bore to receive the shaft, a pocket in the side of the bore positioned at one side of the transverse axis thereof, a wedge loosely positioned in the pocket of the sleeve to lock it to the shaft, and means slidably associated with the opposite edges of the wedge to support the wedge in the pocket when the coupling is not in use.

2. In a shaft coupling, the combination of a sleeve having a bore therethrough and a circular shaped pocket in the side of the bore positioned at one side of the transverse axis thereof, a crescent shaped wedge positioned in the pocket to engage the sleeve and shaft and springs slidably associated with said wedge for holding the wedge in the pocket while not in use.

3. In a shaft coupling, the combination of a sleeve including a bore to receive the shafts and having circular pockets in the side of the bore, a crescent shaped wedge movably positioned in the pocket of the sleeve, springs slidably associated with said wedge for holding the wedges against the shaft to insure a locking engagement between the sleeve and shaft.

4. In a shaft coupling, the combination of a sleeve including a bore to receive the shafts and having circular pockets and annular grooves in the inside of the sleeve, a crescent shaped wedge loosely positioned in the pocket of the sleeve around the shaft, springs positioned in the annular grooves for holding the wedges against the shaft to insure their locking engagement with the sleeve and shaft.

5. In a shaft coupling, the combination of a sleeve including a bore to receive the shafts and having circular pockets in the side of the bore, a crescent shaped wedge loosely positioned in the pocket of the sleeve and having grooves in its end portions, springs to engage the grooves to support the wedges against the shaft and to insure a locking engagement between the sleeve and shaft.

6. In a shaft coupling, the combination of a sleeve including a bore to receive the shafts and having circular pockets and annular grooves, a crescent shaped wedge loosely positioned in the pocket of the sleeve, and having circular grooves in its end portions, springs positioned in the annular grooves and secured to turn with the sleeve for positioning the wedges to move against the shaft and within the pocket.

7. In a shaft coupling, the combination of a sleeve including a bore to receive the shafts, circular pockets in the side of the bore, a crescent shaped wedge loosely positioned in the pocket of the sleeve and having beveled end portions, springs for engaging the edges of the wedges to hold them against the shaft for the purpose of insuring a locking engagement of the sleeve and shaft.

Signed at Bridgeport, in the county of Fairfield and State of Connecticut, this 8th day of March, A. D. 1919.

FRANK O. HOAGLAND.

Witnesses:
C. M. NEWMAN,
LILLIAN M. ALLING.